US008863293B2

(12) United States Patent
Christodorescu et al.

(10) Patent No.: US 8,863,293 B2
(45) Date of Patent: Oct. 14, 2014

(54) PREDICTING ATTACKS BASED ON PROBABILISTIC GAME-THEORY

(75) Inventors: Mihai Christodorescu, Briarcliff Manor, NY (US); Dmytro Korzhyk, Durham, NC (US); Reiner Sailer, Scarsdale, NY (US); Douglas L. Schales, Ardsley, NY (US); Marc Ph Stoecklin, Riverdale, NY (US); Ting Wang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 13/478,290

(22) Filed: May 23, 2012

(65) Prior Publication Data

US 2013/0318615 A1    Nov. 28, 2013

(51) Int. Cl.
  *G06F 21/00* (2013.01)
  *G06F 21/55* (2013.01)
  *H04L 29/06* (2006.01)
  *G06Q 10/06* (2012.01)

(52) U.S. Cl.
  CPC .............. *G06F 21/00* (2013.01); *G06F 21/552* (2013.01); *H04L 63/20* (2013.01); *H04L 63/1408* (2013.01); *G06Q 10/06375* (2013.01)
  USPC .............................................. 726/25; 726/23

(58) Field of Classification Search
  CPC . G06F 21/00; G06F 21/552; G06Q 10/06375; H04L 63/20; H04L 63/1408
  USPC .................................................... 726/22–25
  See application file for complete search history.

(56) References Cited

U.S. PATENT DOCUMENTS

| | | | |
|---|---|---|---|
| 7,013,395 B1 * | 3/2006 | Swiler et al. ..................... | 726/25 |
| 7,162,741 B2 | 1/2007 | Eskin et al. | |
| 7,530,105 B2 * | 5/2009 | Gilbert et al. ................... | 726/22 |
| 7,568,232 B2 | 7/2009 | Mitomo et al. | |
| 7,702,606 B1 * | 4/2010 | Heidenreich et al. ........... | 706/45 |
| 7,813,739 B2 * | 10/2010 | Teo et al. ....................... | 455/450 |
| 7,917,393 B2 | 3/2011 | Valdes et al. | |

(Continued)

OTHER PUBLICATIONS

Sun et al. "Towards adaptive anomaly detection in cellular mobile networks". In 2006 3rd IEEE Consumer Communications and Networking Conference, CCNC 2006, by Sun, Bo, Chen, Zhi, Wang, Ruhai, Yu, Fei, Leung, Victor C. M., 666-670. Institute of Electrical and Electronics Engineers Computer Society, Oct. 9, 2006.*

(Continued)

*Primary Examiner* — Catherine Thiaw
*Assistant Examiner* — Don Zhao
(74) *Attorney, Agent, or Firm* — Tutunjian & Bitetto, P.C.; Anne V. Dougherty

(57) ABSTRACT

Methods for determining cyber-attack targets include collecting and storing network event information from sensors to extract information regarding an attacker; forming an attack scenario tree that encodes network topology and vulnerability information including paths from known compromised nodes to a set of potential targets; calculating a likelihood for each of the paths using a processor; calculating a probability distribution for the set of potential targets to determine which potential targets are most likely pursued by the attacker; calculating a probability distribution over a set of nodes and node vulnerability types already accessed by the attacker; determining a network graph edge to remove which minimizes a defender's expected uncertainty over the potential targets; and removing the determined network graph edge.

20 Claims, 4 Drawing Sheets

(56) References Cited

U.S. PATENT DOCUMENTS

| | | | |
|---|---|---|---|
| 8,046,835 | B2 | 10/2011 | Herz |
| 8,108,188 | B2 * | 1/2012 | Johnson .......................... 703/6 |
| 8,549,641 | B2 | 10/2013 | Jakobsson |
| 2002/0059078 | A1 * | 5/2002 | Valdes et al. ...................... 705/1 |
| 2007/0226796 | A1 * | 9/2007 | Gilbert et al. .................. 726/22 |
| 2007/0240215 | A1 * | 10/2007 | Flores et al. ..................... 726/24 |
| 2008/0005555 | A1 * | 1/2008 | Lotem et al. ................. 713/150 |
| 2008/0082380 | A1 * | 4/2008 | Stephenson ...................... 705/7 |
| 2008/0109272 | A1 * | 5/2008 | Sheopuri et al. ................. 705/7 |
| 2009/0099987 | A1 * | 4/2009 | Tambe et al. .................. 706/14 |
| 2009/0119239 | A1 * | 5/2009 | Tambe et al. .................. 706/46 |
| 2009/0133122 | A1 * | 5/2009 | Koo et al. ....................... 726/23 |
| 2009/0287623 | A1 * | 11/2009 | Martin et al. ................... 706/13 |
| 2009/0307772 | A1 * | 12/2009 | Markham et al. .............. 726/22 |
| 2009/0307777 | A1 * | 12/2009 | He et al. ......................... 726/25 |
| 2010/0058456 | A1 | 3/2010 | Jajodia et al. |
| 2010/0117889 | A1 | 5/2010 | Grube et al. |
| 2010/0235285 | A1 | 9/2010 | Hoffberg |
| 2010/0313021 | A1 | 12/2010 | Xu et al. |
| 2011/0055925 | A1 * | 3/2011 | Jakobsson ...................... 726/25 |
| 2011/0061104 | A1 * | 3/2011 | Sarraute Yamada et al. ... 726/23 |
| 2011/0231937 | A1 * | 9/2011 | Lippmann et al. ............. 726/25 |
| 2011/0288692 | A1 | 11/2011 | Scott |
| 2012/0180126 | A1 * | 7/2012 | Liu et al. ........................ 726/22 |
| 2012/0222089 | A1 | 8/2012 | Whelan et al. |
| 2013/0013551 | A1 | 1/2013 | Mathews et al. |
| 2013/0019317 | A1 | 1/2013 | Whelan et al. |
| 2013/0055404 | A1 | 2/2013 | Khalili |

OTHER PUBLICATIONS

Dewri, R., et al. "Optimal Security Hardening Using Multi-Objective Optimization on Attack Tree Models of Networks" Proceedings of the 14th ACM Conference on Computer and Communications Security. Oct. 2007. pp. 204-213.

Kiekintveld, C., et al. "Approximation Methods for Infinite Bayesian Stackelberg Games: Modeling Distributional Payoff Uncertainty" Proceedings of 10th International Conference on Autonomous Agents and Multiagent Systems (AAMAS). May 2011. (8 pages).

Zhu, M., et al. "Stackelberg-Game Analysis of Correlated Attacks in Cyber-Physical Systems" American Control Conference. Jun. 2011. pp. 4063-4068.

Zonouz, S., et al. "RRE: A Game-Theoretic Intrusion Response and Recovery Engine" Proceedings of the IEEE/IFIP International Conference on Dependable Systems and Networks (DSN). Jun. 2009. pp. 429-438.

Non-Final Office Action issued on May 13, 2014 for U.S. Appl. No. 13/487,774. (30 Pages).

* cited by examiner

PREDICTING ATTACKS BASED ON PROBABILISTIC GAME-THEORY

BACKGROUND

1. Technical Field

The present invention relates to computer security and, more particularly, to modeling instances and targets for in-progress attacks using probabilistic game theory.

2. Description of the Related Art

A large increase in the frequency of cybersecurity attacks has prompted industry and academia to find new ways to respond to the threat. Defensive mechanisms have been proposed in an attempt to detect and prevent attackers from reaching their targets, e.g., servers that store high-value data. In practice, large networks can have hundreds of high-value servers, each one a possible target of attack, thus making it difficult to determine the goal of a targeted attacker and to respond appropriately.

In an enterprise network, which may include hundreds of thousands of network entities such as laptops, desktop computers, and servers, the network entities can be categorized into different classes. For example, an entity may be a web server, an SQL server, a user terminal, etc. In a strongly connected network, the removal of a small number of connections will not partition the network into isolated parts. At present, however, detection and response systems do not provide adequate insight to system operators as to how best to respond to a strategic attacker. In real-life networks, targets are numerous and easily reachable, making existing approaches that assume a small target set impractical to use.

SUMMARY

A method for determining cyber-attack targets includes collecting and storing network event information from a plurality of sensors to extract information regarding an attacker; forming an attack scenario tree that encodes network topology and vulnerability information including a plurality of paths from known compromised nodes to a set of potential targets; calculating a likelihood for each of the plurality of paths using a processor; and calculating a probability distribution for the set of potential targets to determine which potential targets are most likely pursued by the attacker.

A method for determining cyber-attack targets includes collecting and storing network event information from a plurality of sensors to extract information regarding an attacker; forming an attack scenario tree that encodes network topology and vulnerability information including a plurality of paths from known compromised nodes to a set of potential targets; calculating a probability distribution over a set of nodes and node vulnerability types already accessed by the attacker using a processor; determining a network graph edge to remove that minimizes a defender's expected uncertainty over the potential targets; and removing the determined network graph edge.

A method for determining cyber-attack targets includes collecting and storing network event information from a plurality of sensors to extract information regarding an attacker; forming an attack scenario tree that encodes network topology and vulnerability information including a plurality of paths from known compromised nodes to a set of potential targets; calculating a likelihood for each of the plurality of paths using a processor; and calculating a probability distribution for the set of potential targets to determine which potential targets are most likely pursued by the attacker; calculating a probability distribution over a set of nodes and node vulnerability types already accessed by the attacker; determining a network graph edge to remove which minimizes a defender's expected uncertainty over the potential targets; and removing the determined network graph edge.

A system for determining cyber-attack target includes a network monitor module configured to collect network event information from sensors in one or more network nodes; a processor configured to extract information regarding an attacker from the network event information, to form an attack scenario tree that encodes network topology and vulnerability information including a plurality of paths from known compromised nodes to a set of potential targets, to calculate a likelihood for each of the plurality of paths, and to calculate a probability distribution for the set of potential targets to determine which potential targets are most likely pursued by the attacker.

A system for determining cyber-attack targets includes a network monitor module configured to collect network event information from sensors in one or more network nodes; a processor configured to extract information regarding an attacker from the network event information, to form an attack scenario tree that encodes network topology and vulnerability information including a plurality of paths from known compromised nodes to a set of potential targets, to calculate a probability distribution over a set of nodes and node vulnerability types already accessed by the attacker, and to determine a network graph edge to remove that minimizes a defender's expected uncertainty over the potential targets; and a network management module configured to remove the determined network graph edge.

A system for determining cyber-attack target includes a network monitor module configured to collect network event information from sensors in one or more network nodes; a processor configured to extract information regarding an attacker from the network event information, to form an attack scenario tree that encodes network topology and vulnerability information including a plurality of paths from known compromised nodes to a set of potential targets, to calculate a likelihood for each of the plurality of paths, and to calculate a probability distribution for the set of potential targets to determine which potential targets are most likely pursued by the attacker, to calculate a probability distribution over a set of nodes and node vulnerability types already accessed by the attacker, and to determine a network graph edge to remove that minimizes a defender's expected uncertainty over the potential targets; and a network management module configured to remove the determined network graph edge.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles employ game theory to predict attacker targets. Using a probabilistic model of attacker behavior, the interactions between a network defender and attacker are modeled, allowing the defender to anticipate future steps of the attack and identify the most likely attack targets based on the observed network events. The present principles use attack scenario trees which represent the possible sequences of high-level attack steps that can be executed at different nodes of the network. This approach differs from the attack-response trees used previously, which represent attack steps within a single network host. Attack scenario trees can be constructed based on past incident reports.

The interaction between the defender and the attacker is modeled as a two-player Stackelberg game. The defender can use the model to further decrease uncertainty about attack target predictions by blocking specific network paths (and indirectly any attack steps that traverse those paths) and influencing the attacker to reveal their intentions while conducting the attack. This allows defenders the benefit of proactively blocking future attack steps.

Figure 1:
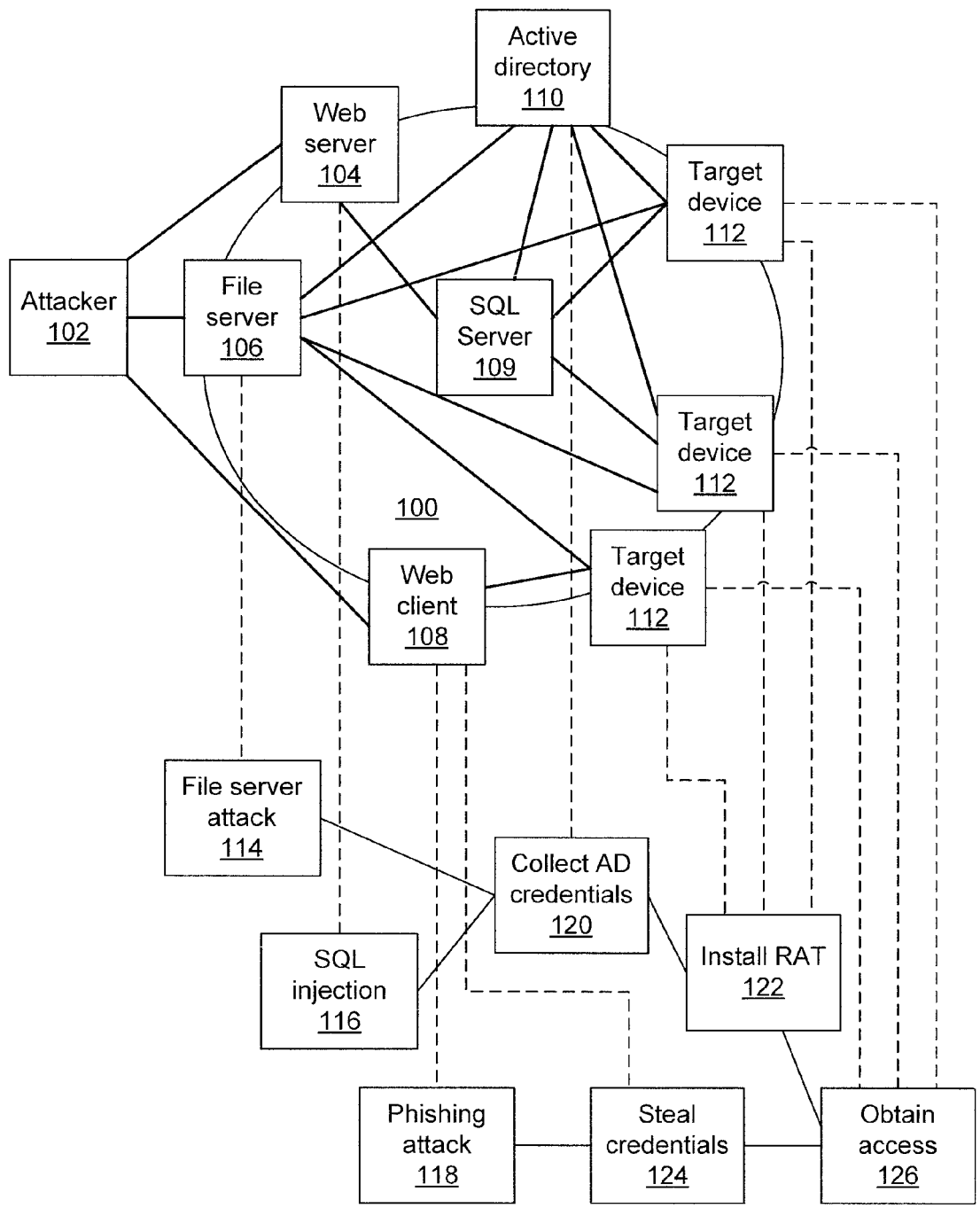
FIG. 1 is a diagram of a network graph and an associated attack tree according to the present principles.

Referring now to FIG. 1, an exemplary network graph and associated attack scenario tree are shown. A given network 100 may be represented by a graph of interconnected nodes, with each node being a device or point of vulnerability on the network, and each edge representing a communication link between two nodes. Each node also has one or more associated vulnerabilities, which an attacker may exploit to compromise the security of the node. Combining the vulnerabilities with the edges of the graph provide structure for the attack scenario tree. The nodes of the attack scenario tree represent high-level steps of a potential attack on a defended network.

In the present example, an attacker 102 may approach network 100 from one of three externally available systems: web server 104, file server 106, and an email or web client 108. Each of these points of attack has an associated vulnerability. For example, web server 104 may be vulnerable to an SQL injection attack 116, and file server 106 may be vulnerable to a respective file server attack 114. Compromising either of these nodes may give access to active directory (AD) server 110, allowing the attacker 102 to gain access to AD credentials 120. The attacker 102 can then use the AD credentials to install a remote access tool 122 on a target device 112. As an alternative approach, the attacker could stage a phishing attack 118 at a web or email client 108, allowing the attacker 102 to steal a user's credentials 124. Either approach will allow the attacker to obtain access 126 to data or services. It should be noted that any given node may be an AND node, where all of the nodes leading up to it must be reached before accessing the AND node, an OR node where any one input node may be reached, or the nodes may implement any other condition or combination of conditions.

The present principles allow a defender to monitor the attack in-progress and provide probabilistic information regarding likely attack paths and targets. By blocking the attacker's access to particular connections, the attack scenario tree can be trimmed and certainty regarding the attacker's goals can be increased.

To formalize the model, the network 100 may be represented as a graph $G=\langle V,E \rangle$, where the nodes V correspond to the services and machines in the network (for example, a web server 104, an SQL server 109, user machines 112), and the edges E correspond to the connections between them. Each node $v \in V$ belongs to a certain type $\theta(v)$, where $\theta:V \rightarrow \Theta$. The node types incorporate the information about node vulnerabilities that can be exploited by the attacker 102. The attack scenario trees are thus constructed of elements of the type set $\Theta$. The set of all attack scenario trees known to the defender is denoted by $S=\{s\}$.

Cyber attacks can be assessed from either the point of view of the defender or from the point of view of the attacker. To the defender, the attacks are paths in the network graph G from the attacker's starting point $v_a \in V$ to a target $t \in V$. From the point of view of the attacker, an attack is a path from one of the leaves to the root of an attack scenario tree $s \in S$. Since s is composed of node types $\theta(v)$ and not of specific nodes, each path in an attack scenario tree s can correspond to multiple paths in G as long as the sequence of node types in G matches the types in scenario s. Suppose I(s) is the set of all paths in G corresponding to a scenario $s=\langle \theta_{q_1}, \ldots \theta_{q_k} \rangle$. Then, for each path $I \in I(s)$, $I=\langle v_{r_1}, \ldots, v_{r_k} \rangle$, one has $\theta(v_{r_i})=\theta_{q_i}$, $i=1, \ldots, k$. I(s) is the set of instantiations of the attack scenario s.

Figure 2:
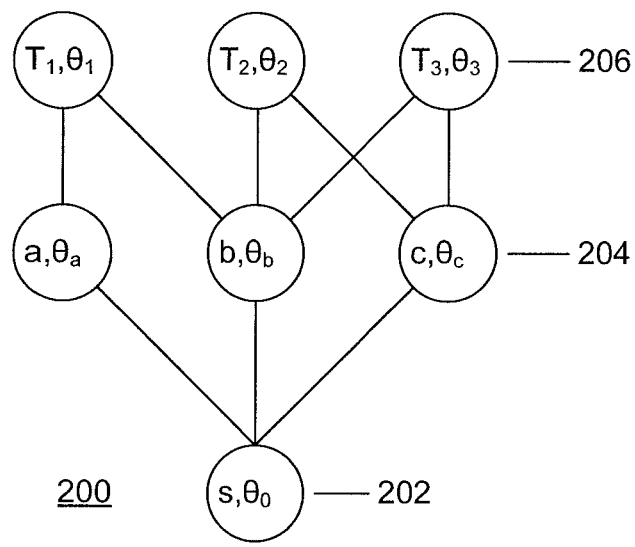
FIG. 2 is an alternative representation of the mapping between the network graph and the associated attack tree according to the present principles.

Referring now to FIG. 2, an abstract representation of the mapping between the network 100 and the associated attack tree is shown. Each node is identified by a name and a type. In this case, an attacker starting at node 202 can proceed to one of three nodes 204. The attacker may then take different paths to reach one of the three target nodes 206.

It can be assumed that the attacker always has control over the starting node 202 $v_a \in V$. As the attacker advances towards one of the target nodes 206 t, the set of active nodes $a \subset V$ which are controlled by the attacker expands until $t \in A$. This process of attacker's expansion over the nodes in V corresponds to a simultaneous expansion of the set $\mathcal{A} \subset \Theta$ of active node types in the attack scenario tree until $\mathcal{A}$ includes the root of the tree. Inferring a probability distribution over the possible sets A and $\mathcal{A}$ helps in predicting the attack targets.

As noted above, the interaction between the defender and the attacker is modeled as a two-player Stackelberg game. A Stackelberg two-player game models strategic interaction between two intelligent agents, designated the leader and the follower. Each player has a finite set of actions to choose from. The leader's set of actions is marked as $A_l$, and the follower's set of actions is marked as $A_f$. A pair of actions $(a_l, a_f)$ chosen by the players is called the outcome of the game. The players' utilities are functions of the outcome. The leader's utility function is denoted by $u_l(a_l, a_f)$ and the follower's utility function by $u_f(a_l, a_f)$. The game proceeds as follows. First, the leader chooses (or commits to) a mixed strategy having a probability distribution over the actions in $A_l$. Then, the follower observes the distribution and chooses a best-response which, generally, can be a probability distribution over $A_f$. There is always a pure-strategy best response for the follower. In other words, one of the optimal best-responses is a degenerate distribution. Moreover, an optimal mixed strategy for the leader can be computed in polynomial time using linear programming techniques.

For the purpose of computing an optimal leader's strategy to commit to, the follower's preferences can be represented by choosing an action for each distribution over the leader's actions, instead of using the follower's utility function $u_f$. The follower's preferences are written as a mapping $f:\sigma(A_l) \to A_f$, where the operator $\sigma(\cdot)$ denotes a set of distributions over a given finite set.

The present principles provide an extension to the described Stackelberg model in which the follower's preferences are described by a mapping $f:\theta(A_l) \to (A_f)$. In other words, if the leader commits to a mixed strategy $s_l \in \sigma(A_l)$ then the follower plays a mixed strategy $f(s_l)$. This extension is called herein a probabilistic Stackelberg model.

A probabilistic Stackelberg model can be used to describe irrational behavior of the follower. The present principles provide a probabilistic Stackelberg model in which the function $f$ is a linear mapping from the vector of probabilities describing the leader's mixed strategy to the vector of probabilities describing the follower's mixed strategy.

TABLE 1

|   | R    | L    |
|---|------|------|
| U | 2, 1 | 4, 0 |
| D | 1, 0 | 3, 1 |

Table 1 shows the potential increase in utility that the leader can achieve by considering a probabilistic follower model rather than assuming that the follower is perfectly rational and optimizing a known utility function is shown. In the following two-player normal-form game, the leader is the row player and the follower is the column player. The leader has two strategies U,D, and the follower has two strategies L,R. Each cell in the table shows the leader's and the follower's utility for the corresponding choice of actions. If the follower is perfectly rational and always chooses the action that maximizes its utility, the optimal strategy to commit to for the leader is $$\left(\frac{1}{2} - \varepsilon\right)U + \left(\frac{1}{2} + \varepsilon\right)D.$$

As a result, the follower best-responds with R, and the leader gets a utility of approximately 3.5.

Note that the follower best-responds with L if the follower plays U with probability 0.5 or higher, and the follower plays D otherwise. However, if the follower is not perfectly rational, the leader's optimal strategy may be different. For example, consider the case in which the follower is actually playing accordingly to a quantal response model. In a quantal response model, each strategy is played with a positive probability proportional to $e^{\lambda u_f}$. Setting $\lambda = 5$ and assuming that the leader is playing the Stackelberg strategy $$\frac{1}{2}U + \frac{1}{2}D,$$

the leader can get an even higher utility by deviating to play D more frequently, because the follower will still play R with a relatively high probability after such deviation. This example demonstrates the potential benefits of using a probabilistic follower model, whether derived from the follower's utility function or defined directly as a probability function on the set of the defender's actions.

Figure 3:
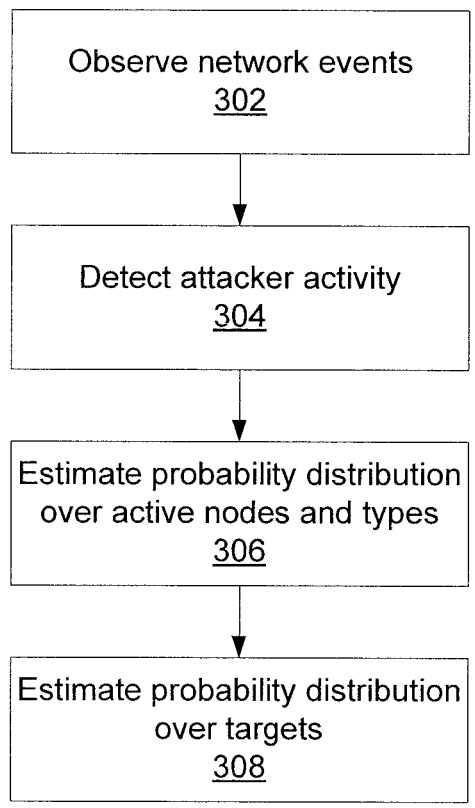
FIG. 3 is a block/flow diagram of a method for determining an attack target according to the present principles.

Referring now to FIG. 3, a method for determining probable targets of an attack is shown. It is assumed that the defender has the ability to monitor some or all of the nodes in a network 100 to recognize possible intrusion. Block 302 monitors such network events. The defender's history of observations $\mathcal{H} = \langle o_1, \ldots, o_k \rangle$ indicate possible nodes that became active for the attacker at block 304, so that $o_1 \in V$. Block 306 estimates a probability distribution over the sets of active nodes A and active node types $\mathcal{A}$. Toward this end, block 306 computes heuristical likelihood scores l for each instantiation path $\pi$ in I(s) as follows)

$$l(\pi) = \max_{q_1 < \ldots < q_m, r_1 < \ldots < r_m} \prod_i p(o_{q_i} | \pi_{r_i}) \prod_{j \neq r_1, \ldots, r_m} \overline{p}(\pi_j)$$

Here, $p(o_{q_i} | \pi_{r_i})$ is the probability of making an observation $o_{q_i}$ when the node $\pi_{r_i}$ is attacked, and $\overline{p}(\pi_j)$ is the probability of the node $\pi_j$ being attacked without triggering any observations. This likelihood score function can be efficiently computed using the following dynamic programming algorithm:

$$l(\pi_{1:i} | \mathcal{H}_{1:j}) = \max(l(\pi_{1:i-1} | \mathcal{H}_{1:j-1}) p(\phi_j | p_i),$$

$$\overline{p}(\pi_i) l(\pi_{1:i-1} | \mathcal{H}_{1:j}),$$

$$l(\pi_{1:i} | \mathcal{H}_{1:j-1}))$$

Using l, block 308 computes a probability distribution over the targets $t \in V$ under the assumption that the attacker will follow one of the attack scenario trees in S according to the estimated distribution over the active node types $\mathcal{A}$ and the active network nodes A. The distribution over the attack targets is estimated using Monte Carlo simulation:

$$P[t | \mathcal{H}] = \sum_A l(A) P[t | A]$$

Here, P[t|A] is estimated by simulating the attack steps according to the corresponding attack scenario tree starting with active node types $\mathcal{A}$. The method of FIG. 3 is repeated each time an attacker advances the attack to a new node. On each step of the simulation, the attacker chooses a network node v adjacent to the set of active nodes A such that the type $\phi(v)$ matches one of the possible next steps in the current state $\mathcal{A}$ of the attack scenario tree. Such attack actions are simulated until the set A expands to include one of the targets t, at which point t is assumed to be the intended target of the attack in the current run of the simulation. The frequency with which target t is attacked in the simulations is the estimate of P[t|A].

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As the defender observes network events and collects information about the progress and location of attacker 102, the defender can modify the network 100 in order to force the attacker 102 to reveal the intended target 112 of the attack. In real-world applications, one way for the defender to react to an ongoing cyberattack is to block network connections over a certain port. Translated into the present model, the defender has the ability to block a network edge in response to the observed network events. Since there are likely multiple ways from the attacker's starting node 202 to the any target 206 in a realistic computer network 100, blocking one edge will not prevent the attack. However, the defender may improve the future predictions about the attacker's intended target by carefully choosing a single graph edge to block.

Figure 4:
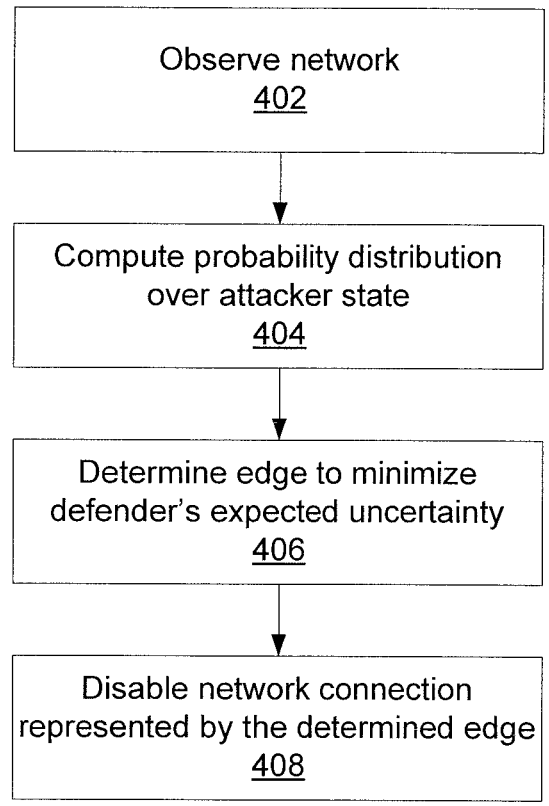
FIG. 4 is a block/flow diagram of an alternative method for determining an attack target according to the present principles.

Referring now to FIG. 4, a method for computing an optimal defender response is shown. Given the observed network events, collected at block 402, block 404 computes a posterior probability distribution over the attacker's state $(A, \mathcal{A})$. The optimal edge $e \in E$ to block is the one that minimizes the defender's expected future uncertainty over the attack targets given the history $\mathcal{H}$ of the observed network events. In other words, block 406 calculates an edge $e = \arg \min_e E[H | \mathcal{H}]$. Block 408 implements that action by, e.g., disabling the network connection represented by edge e.

In one scenario, the attacker has only reached node s 202, and all attack paths going from the bottom of the graph to the top are possible. Additionally, the attacker chooses the next possible node to attack uniformly at random. At first, the probability distribution over the targets is (1/3,1/3,1/3). Note that the distribution will remain the same if the attacker chooses node b as the next node to attack. However, if the attacker chooses node a, then it is certain that $t_1$ is the target of the attack. If the attacker chooses node c, targets $t_2$ and $t_3$ are two equally likely targets.

Given a probability distribution p over the targets (e.g., as calculated in FIG. 3), the defender's uncertainty is measured as Shannon's entropy H as follows:

$$H = -\sum_t P(t)\log P(t)$$

In the above example, the entropy which represents the uncertainty over the attack target, given the history of attacked nodes, is computed as follows:

$$H(s) = 3\left(-\frac{1}{3}\log\frac{1}{3}\right) = 0.477$$

$$H(sb) = H(s) = 0.477$$

$$H(sa) = 0$$

$$H(sc) = 2\left(-\frac{1}{2}\log\frac{1}{2}\right) = 0.301$$

Figure 5:
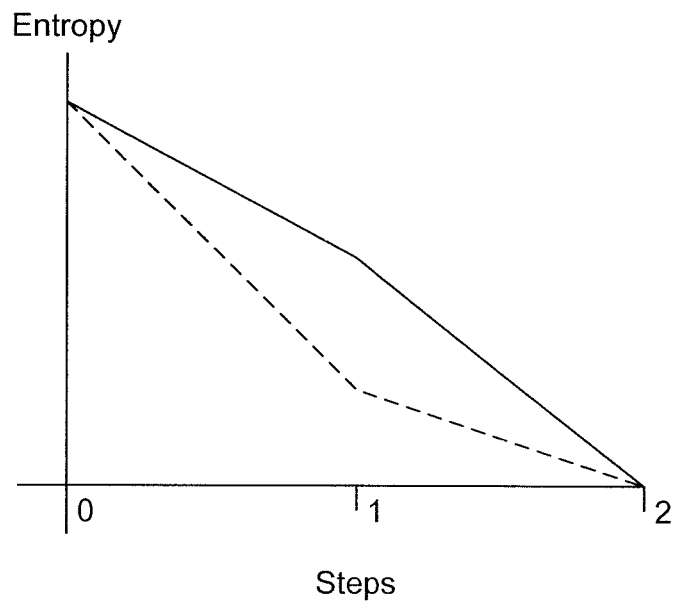
FIG. 5 is a graph showing a reduction in entropy after removing a network graph edge in accordance with the present principles.

Referring now to FIG. 5, a graph showing expected entropy for two scenarios is shown. The vertical axis shows the calculated entropy, while the horizontal axis shows which step of the attack is being considered. The expected entropy is plotted with a solid line. The entropy can be reduced, however, if the possibility of the attacker choosing node b is removed. Removing the edge between s and b results in a reduction of the expected entropy after the next attack step. This reduced entropy with a dashed line on the same plot. By step 2, entropy is zero for both plots because the attacker has reached the target t.

Using the present principles provides a significant improvement in terms of the defender's uncertainty as to the attacker's potential targets. Moreover, by blocking paths in concordance with the probabilistic Stackelberg model of the present principles, the defender is able to further reduce the uncertainty by influencing the attacker's next move. Furthermore, the present principles are scalable, with good performance in attack paths of length 3, 4, and 5—it should be noted that practical attack paths rarely exceed four steps in length. Simulations run with over 1000 nodes and with attack path lengths of five were able to complete in a matter of seconds, making the present principles practical for real-world application.

Figure 6:
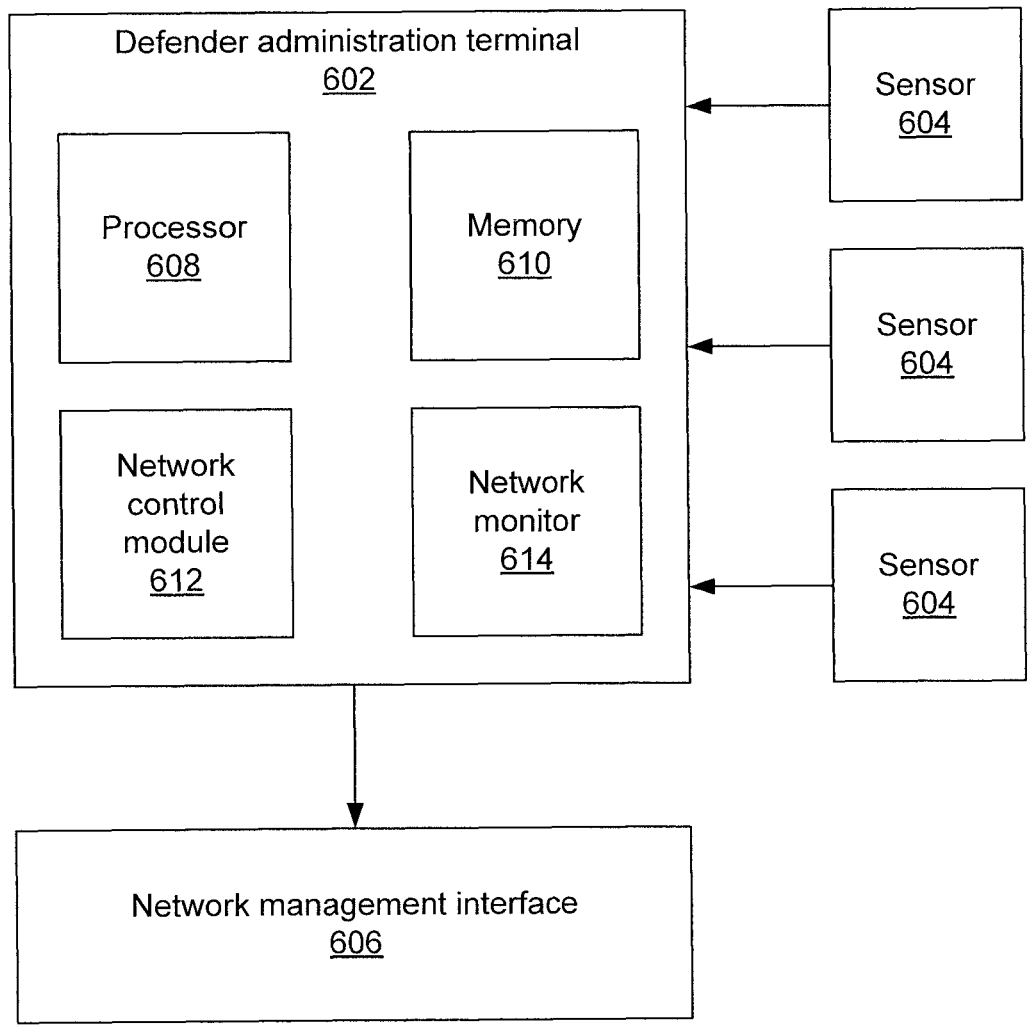
FIG. 6 is a diagram of a system for determining an attack target according to the present principles.

Referring now to FIG. 6, a system for network defense is shown. A defender employs a defender administration terminal 602 to observe and respond to an attacker's actions. The defender administration terminal 602 may be a stand-alone device, or may be part of a more general purpose administration terminal. The defender terminal 602 communicates with sensors 604 distributed throughout a network 100 to collect information regarding potential intrusions. The sensors may be incorporated in any node in a network 100 and may monitor any process or component to detect irregular activities. Multiple sensors 604 may be incorporated in a single node. Sensors 604 may provide detailed information regarding the attacker and its activities, may report on any irregular activity, or may simply represent logs for all activities in the system, said logs to be analyzed by the defender terminal 602. The sensors 604 may include software installed on nodes to monitor system calls and user activities, or alternatively be standalone devices such as traffic sniffers configured to detect particular suspicious forms of network traffic to or from monitored nodes.

The defender administration terminal 602 processes the data provided by sensors 604 and determines likely targets for the attacker. The defender terminal 602 also calculates an optimal defender response to reduce the uncertainty in the attacker's targets. Defender terminal 602 includes a processor 608 and memory 610 to collect and utilize the sensor data using network monitor 614. The network monitor 614 collects data from sensors 604 and processes that data from potentially heterogeneous sources into a usable form. The network monitor may, for example, parse logs provided by sensors 604 to find suspicious or abnormal entries. The processor 608 uses the sensor data provided by network monitor 614 and stored in memory 610 to produce the most probable targets and response.

Once the processor 608 calculates an optimal response, the network control module 612 executes the response using a network management interface 606. The network management 606 interface may represent any appropriate form of network management, including for example a simple network management protocol (SNMP) device. In this manner, the defender administration terminal 602 can disconnect links in a network 100, or take similar network-level measures that prevent the attacker to proceed along the chosen network links (e.g., the defender could choose to enable a firewall system on that link, instead of disconnecting the link). The changed network topology forces the attacker along different paths, and the attacker's response to the defender's action substantially reduces the uncertainty regarding the attacker's intentions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for determining cyber-attack target nodes, comprising:

collecting and storing network event information from a plurality of sensors to extract information regarding an attacker;

forming an attack scenario tree that encodes network topology and vulnerability information including a plurality of paths from known compromised nodes to a set of potential target nodes;

calculating a likelihood of an attack from the attacker for each of the plurality of paths using a processor, based on a first probability of an attack on each node in each path and a second probability of each node in each path being attacked without triggering any observations; and wherein calculating the first probability and the second probability determines which potential target nodes are most likely pursued by the attacker.

2. The method of claim 1, wherein the network event information comprises network traffic information.

3. The method of claim 1, wherein the network event information comprises node system calls.

4. The method of claim 1, wherein the network event information comprises activity logs.

5. The method of claim 1, wherein the likelihood 1 for each of the plurality of paths π is computed as $$l(\pi) = \max_{q_1 < \ldots < q_m, r_1 < \ldots < r_m} \prod_i p(o_{q_i} | \pi_{r_i}) \prod_{j \neq r_1, \ldots, r_m} \bar{p}(\pi_j),$$

where $p(o_{q_i}|\pi_{r_i})$ is a probability of making an observation $o_{q_i}$ when a node $\pi_{r_i}$ is attacked and $\bar{p}(\pi_j)$ is the probability of the node $\pi_j$ being attacked without triggering any observations.

6. The method of claim 1, wherein the probability distribution for the set of potential targets is computed using Monte Carlo simulation.

7. The method of claim 6, wherein the probability distribution for the set of potential targets is computed as $$P[t | \mathcal{H}] = \sum_A l(A) P[t | A],$$

where $P[t|A]$ is a probability of an attacker pursuing a target node t given a set of occupied nodes A, and $l(A)$ is a likelihood of the set of nodes A being occupied.

8. A method for determining cyber-attack target nodes, comprising:
collecting and storing network event information from a plurality of sensors to extract information regarding an attacker;
forming an attack scenario tree that encodes network topology and vulnerability information including a plurality of paths from known compromised nodes to a set of potential target nodes;
calculating a probability distribution over a set of nodes and node vulnerability types already accessed by the attacker using a processor, based on a first probability of observing an attack on each node in each path and a second probability of each node in each path being attacked without triggering an observation, to determine which potential target nodes are most likely pursued by the attacker;
determining a network graph edge to remove that minimizes a defender's expected uncertainty over the potential targets; and
removing the determined network graph edge.

9. The method of claim 8, wherein the network event information comprises network traffic information.

10. The method of claim 8, wherein the network event information comprises node system calls.

11. The method of claim 8, wherein the network event information comprises activity logs.

12. The method of claim 8, wherein the defender's expected uncertainty over the potential targets is determined as a Shannon entropy.

13. The method of claim 8, wherein the determined network graph edge is removed by disconnecting a corresponding network communication link.

14. The method of claim 8, wherein the determined network graph edge is removed by adapting a corresponding network communication link to block the attacker's use of the determined network graph edge.

15. A system for determining cyber-attack target nodes, comprising:
a network monitor module configured to collect network event information from sensors in one or more network nodes;
a processor configured to extract information regarding an attacker from the network event information, to form an attack scenario tree that encodes network topology and vulnerability information including a plurality of paths from known compromised nodes to a set of potential target nodes, and to calculate a likelihood of an attack from the attacker for each of the plurality of paths, based on a first probability of an attack on each node in each path and a second probability of each node in each path being attacked without triggering any observations, wherein the first probability and the second probability determine which potential target nodes are most likely pursued by the attacker.

16. The system of claim 15, wherein the network event information comprises node system calls.

17. The system of claim 15, wherein the network event information comprises activity logs.

18. The system of claim 15, wherein the processor is configured to compute likelihood l for each of the plurality of paths $\pi$ as $$l(\pi) = \max_{q_1 < \ldots < q_m, r_1 < \ldots < r_m} \prod_i p(o_{q_i} | \pi_{r_i}) \prod_{j \neq r_1, \ldots, r_m} \bar{p}(\pi_j),$$

where $p(o_{q_i}|\pi_{r_i})$ is a probability of making an observation $o_{q_i}$ when a node $\pi_{r_i}$ is attacked and $\bar{p}(\pi_j)$ is the probability of the node $\pi_j$ being attacked without triggering any observations.

19. The system of claim 15, wherein processor is configured to compute the probability distribution for the set of potential targets using a Monte Carlo simulation.

20. The system of claim 15, wherein the processor is configured to compute the probability distribution for the set of potential targets as $$P[t | \mathcal{H}] = \sum_A l(A) P[t | A],$$

where $P[t|A]$ is a probability of an attacker pursuing a target node t given a set of occupied nodes A, and $l(A)$ is a likelihood of the set of nodes A being occupied.

* * * * *